US011457275B2

(12) United States Patent
Batmunkh

(10) Patent No.: US 11,457,275 B2
(45) Date of Patent: Sep. 27, 2022

(54) DISPLAY APPARATUS AND CONTROL METHOD THEREOF

(71) Applicant: SAMSUNG ELECTRONICS CO., LTD., Suwon-si (KR)

(72) Inventor: Dulguun Batmunkh, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 196 days.

(21) Appl. No.: 16/960,235

(22) PCT Filed: Dec. 19, 2018

(86) PCT No.: PCT/KR2018/016177
§ 371 (c)(1),
(2) Date: Jul. 6, 2020

(87) PCT Pub. No.: WO2019/135512
PCT Pub. Date: Jul. 11, 2019

(65) Prior Publication Data
US 2021/0067830 A1 Mar. 4, 2021

(30) Foreign Application Priority Data
Jan. 4, 2018 (KR) .................. 10-2018-0001088

(51) Int. Cl.
H04N 21/442 (2011.01)
A63F 13/79 (2014.01)
(Continued)

(52) U.S. Cl.
CPC ....... H04N 21/44204 (2013.01); A63F 13/79 (2014.09); A63F 13/86 (2014.09); H04N 21/43635 (2013.01)

(58) Field of Classification Search
CPC ....... H04N 21/44204; H04N 21/43635; H04N 21/44008; H04N 21/4363; H04N 21/4436; H04N 21/43615; A63F 13/79; A63F 13/86
See application file for complete search history.

(56) References Cited

U.S. PATENT DOCUMENTS 6,599,194 B1 * 7/2003 Smith ............... A63F 13/12
463/30
6,878,067 B2 * 4/2005 Blanco ............... A63F 13/10
463/43
(Continued)

FOREIGN PATENT DOCUMENTS

JP 2009-129362 6/2009
JP 2009-164812 7/2009
(Continued)

OTHER PUBLICATIONS

Korean Notice of Allowance issued in Korean Patent Application No. 10-2018-0001088 dated May 2, 2022.

Primary Examiner — Michael E Teitelbaum
(74) Attorney, Agent, or Firm — Staas & Halsey LLP

(57) ABSTRACT

Disclosed is a display apparatus and a control method thereof. The display apparatus includes: a display comprising a screen to display an image thereon; a processor configured to: display on the screen of the display an image of a content consisting of a plurality of frames, identify whether a use state of the content is in an idle state based on a change in an image between consecutive first and second frames, and perform an operation according to the identified state. The processor is configured to identify a change in an image in a first region comprising a center of the screen by providing a weight greater than that of a change in an image in a second region located near the first region.

14 Claims, 14 Drawing Sheets

(51) Int. Cl.
    *A63F 13/86*           (2014.01)
    *H04N 21/4363*       (2011.01)

(56) References Cited

U.S. PATENT DOCUMENTS

| | | |
|---|---|---|
| 9,047,534 B2 | 6/2015 | Harmanci et al. |
| 9,405,993 B2 | 8/2016 | Jia |
| 2008/0018561 A1* | 1/2008 | Song .................... G09G 3/2803 |
| | | 345/60 |
| 2010/0134689 A1* | 6/2010 | Flores ................ H04N 21/4318 |
| | | 348/672 |
| 2013/0039584 A1 | 2/2013 | Harmanci et al. |
| 2014/0009625 A1* | 1/2014 | Lee ...................... H04N 17/045 |
| | | 348/184 |
| 2014/0126813 A1 | 5/2014 | Jia |
| 2015/0009334 A1* | 1/2015 | Kwon .................... G06F 3/013 |
| | | 348/164 |
| 2015/0332124 A1 | 11/2015 | Yang et al. |
| 2016/0255406 A1 | 9/2016 | Soh et al. |
| 2017/0046595 A1 | 2/2017 | Dwan et al. |

FOREIGN PATENT DOCUMENTS

| | | |
|---|---|---|
| KR | 10-2008-0008632 A | 1/2008 |
| KR | 10-2012-0073892 | 7/2012 |
| KR | 10-2014-0004991 A | 1/2014 |
| KR | 10-2016-0104493 A | 9/2016 |
| KR | 10-1660778 | 9/2016 |
| WO | 2015/172751 | 12/2015 |
| WO | 2015/182751 | 12/2015 |

* cited by examiner

FIG. 9

$$MAD = \frac{4*(W_{co}+W_e)+W_{ce}}{n*m*9} \sum_{i=1}^{n}\sum_{j=1}^{m} |Y_{ij}-\hat{Y}_{ij}|*W_{co|ce|e}, \text{ for } i \leq n, j \leq m$$

Y - first frame, Ŷ - second frame and n,m - width and height

FIG. 11

$$STATE(MAD, P_{idle}, P_{active}) = \begin{cases} MAD > T_{high} & \rightarrow & P_{idle} = P_{active} = 0 \text{ (new scene)} \\ T_{high} \geq MAD \geq T_{low} & \rightarrow & P_{active} + = 1 \\ MAD < T_{low} & \rightarrow & P_{idle} + = 1 \end{cases}$$

$T_{high}$ - high threshold, $\quad P_{idle}$ - number of idle polls and $T_{low}$ - low threshold, $P_{active}$ - number of active polls.

FIG. 13

| 131 Measurement algorithms | 132 True Positive | 133 Ground Truth | 134 Detected | 135 Precision | 136 Recall | 137 Processing time per image (in sec) |
|---|---|---|---|---|---|---|
| Weighted mean absolute difference | 67606 | 71048 | 74001 | 91.36% | 95.16% | 0.0844s |
| Mean absolute difference | 69123 | 71048 | 80474 | 85.89% | 97.29% | 0.0868s |
| Histogram difference [2] | 38785 | 71048 | 47338 | 81.93% | 54.59% | 0.0858s |
| Optical flow difference [3] | 69904 | 71048 | 89284 | 78.29% | 98.39% | 1.6184s |

130

DISPLAY APPARATUS AND CONTROL METHOD THEREOF

CROSS-REFERENCE TO RELATED APPLICATIONS

This application is a U.S. National Stage Application which claims the benefit under 35 U.S.C. § 371 of International Patent Application No. PCT/KR2018/016177, filed on Dec. 19, 2018, which claims the priority benefit of Korean Patent Application No. 10-2018-0001088, filed on Jan. 4, 2018 in the Korean Patent and Trademark Office, the disclosures of which are hereby incorporated by reference in their entirety.

TECHNICAL FIELD

The disclosure relates to a display apparatus and a control method thereof, and more particularly to a display apparatus for determining whether a content image is active and a control method thereof.

BACKGROUND ART

As the online game industry has grown rapidly in recent years, people can now easily access various online games without time and space constraints. As a result, most parents wish to monitor whether their children are exposed to online games for a long time.

However, it is difficult for parents to check whether children do online games when the parents are at work or out.

Even if parents know their children are doing online games, it is difficult to check how long the children have been doing online games, and thus it is not easy for parents to limit time their children spend on online games.

As most of online games use a lot of resources in the system while being played, if an online game is used simultaneously with other applications, performance such as a game screen and speed may be affected.

TECHNICAL PROBLEM

An aspect of the disclosure is to solve the conventional problems described above, and provide a display apparatus for determining whether a content image being displayed by a screen is in an active state or an idle state, and a control method thereof.

Another aspect of the disclosure is to solve the conventional problems described above, and provide a display apparatus for optimizing a use of an application depending on whether a content image is in an idle state, and a control method thereof.

TECHNICAL SOLUTION

According to an embodiment of the disclosure, there is provided a display apparatus. The display apparatus includes: a display including a screen to display an image thereon; a processor configured to: display on the screen of the display an image of a content consisting of a plurality of frames, identify whether a use state of the content is in an idle state based on a change in an image between consecutive first and second frames, and perform an operation according to the identified state, and the processor is configured to identify a change in an image in a first region including a center of the screen by providing a weight greater than that of a change in an image in a second region located near the first region.

According to the embodiment of the disclosure as above, an actual viewing time of a content image may be monitored by determining whether the content image being displayed by a screen is in an active state or an idle state. Also, a use of an application may be optimized depending on whether a content image is in an idle state.

The display apparatus may further include a connector configured to connect an external apparatus, and the processor may be configured to receive the content from the external apparatus through the connector. Accordingly, whether the content image is in the idle state can be determined by analyzing frames of the content transmitted from the outside.

The processor may be configured to identify the change in the image based on a difference in brightness between the first and second frames. Accordingly, whether the content image is in the idle state can be determined by using the degree of change in brightness between the consecutive frames.

The processor may be configured to identify the change in the image based on a weighted mean absolute difference between the first and second frames. Accordingly, a change in an image may be determined by assigning different weighted values to the center and neighboring regions of a screen.

The processor may be configured to assign different weighted values to the first and second regions at respective update cycles. Accordingly, different weight values may be assigned by taking into account how often an image is updated in the center and neighboring regions of a screen.

The processor may be configured to assign different weighted values to the first and second regions according to at least one of a genre and type of the content. Accordingly, different weighted values may be assigned to center and neighboring regions of a screen according to characteristics of a content.

The processor may be configured to identify that a use state of the content is an idle state based on a degree of the change in the image being lower than a threshold value. Accordingly, if the difference in brightness of consecutive frames is small, an image of a content may be identified to have been suspended or has no interaction with a user.

The processor may be configured to identify that a use state of the content is an active state based on a change in the image in the idle state being a predetermined value or higher. Accordingly, the weighted MAD may be used to identify whether the content has been switched to the active state.

The processor may be configured to allow a switch between the idle state and active state corresponding to at least one of a lapse of a minimum maintenance time of the content or an excess of the number of minimum occurrences of a switch event. Accordingly, the state maintenance time and the number of occurrence of switches may be used to identify whether to switch between the idle state and active state.

The second region may include at least one of a corner region and an edge region of the screen. Accordingly, a change in an image in the corner or edge region of a screen may be assigned with a lower weighted value than the center of the screen.

The first region may be a display region of a main image of the content and the second region may be a display region of a user interface (UI) menu. Accordingly, a change in an image in the region displaying the main image may be assigned with a higher weighted value than the region displaying the state and information.

According to another embodiment of the disclosure, there is provided a computer program product. The computer program product includes: a memory configured to store a plurality of instructions therein; and a processor, and the instructions includes, upon execution by the processor, displaying on a screen of a display an image of a content consisting of a plurality of frames according to a user input, identifying a change in an image between consecutive first and second frames in a first region including a center of the screen by providing a weight greater than that of a change in an image in the second region located near the first region, identifying whether a use state of the content is an idle state based on the change in the image, and performing an operation according to the identified state.

According to the embodiment of the disclosure as above, an actual viewing time of a content image may be monitored by determining whether the content image being displayed by a screen is in an active state or an idle state. Also, a use of an application may be optimized depending on whether a content image is in an idle state.

The instruction may include determining a change in the image based on a difference in brightness between the first and second frames. Accordingly, whether the content image is in the idle state can be determined by using the degree of change in brightness between consecutive frames.

According to other embodiment of the disclosure, there is provided a method for controlling a display apparatus, The method includes: displaying on a screen an image of a content consisting of a plurality of frames; identifying a change in an image between consecutive first and second frames in a first region including a center of the screen by providing a weight greater than that of a change in an image in a second region located near the first region; identifying whether a use state of the content is an idle state based on the change in the image; and performing an operation according to the identified state, upon execution by the processor.

According to the embodiment of the disclosure as above, an actual viewing time of a content image may be monitored by determining whether the content image being displayed by a screen is in an active state or an idle state. Also, a use of an application may be optimized depending on whether a content image is in an idle state.

The method may further includes: connecting an external apparatus; and receiving the content from the connected external apparatus. Accordingly, whether the content image is in the idle state can be determined by analyzing frames of the content transmitted from the outside.

The method may further includes identifying the change in the image based on a difference in brightness between the first and second frames. Accordingly, whether the content image is in the idle state can be determined by using the degree of change in brightness between the consecutive frames.

The method may include identifying the change in the image based on a weighted mean absolute difference between the first and second frames. Accordingly, a change in an image may be identified by assigning different weighted values to the center and neighboring regions of a screen.

The method may include assigning different weighted values to the first and second regions at respective update cycles. Accordingly, different weight values may be assigned by taking into account how often an image is updated in the center and neighboring regions of a screen.

The method may include assigning different weighted values to the first and second regions according to at least one of a genre and type of the content. Accordingly, different weighted values may be assigned to center and neighboring regions of a screen according to characteristics of a content.

The method may include identifying that a use state of the content is an idle state based on a degree of the change in the image being lower than a threshold value. Accordingly, if the difference in brightness of consecutive frames is small, an image of a content may be identified to have been suspended or has no interaction with a user.

The method may include identifying that a use state of the content is an active state based on a change in the image in the idle state being a predetermined value or higher. Accordingly, the weighted MAD may be used to determine whether the content has been switched to the active state.

The second region may include at least one of a corner region and an edge region of the screen. Accordingly, a change in an image in the corner or edge region of a screen may be assigned with a lower weighted value than the center of the screen.

ADVANTAGEOUS EFFECTS

As described above, according to the disclosure, an actual viewing time of a content image may be monitored by determining whether the content image being displayed by a screen is in an active state or an idle state.

Also, according to the disclosure, a use of an application may be optimized depending on whether a content image is in an idle state.

DESCRIPTION OF DRAWINGS

FIG. 9 illustrates a detailed equation of a weighted mean absolute difference for determining a change in an image according to an embodiment of the disclosure.

FIG. 11 illustrates an example of an algorithm for determining a use state of a content according to an embodiment of the disclosure.

FIGS. 13 and 14 illustrate examples of comparison of accuracy of various algorithms for determining a use state of a content according to an embodiment of the disclosure.

BEST MODE

Below, embodiments of the disclosure will be described in detail with reference to accompanying drawings, to be easily carried out by a person having an ordinary skill in the art. The disclosure may be embodied in various different forms, and not limited to the embodiment set forth herein. For clarity of description, like numerals refer to like elements throughout.

Figure 1:
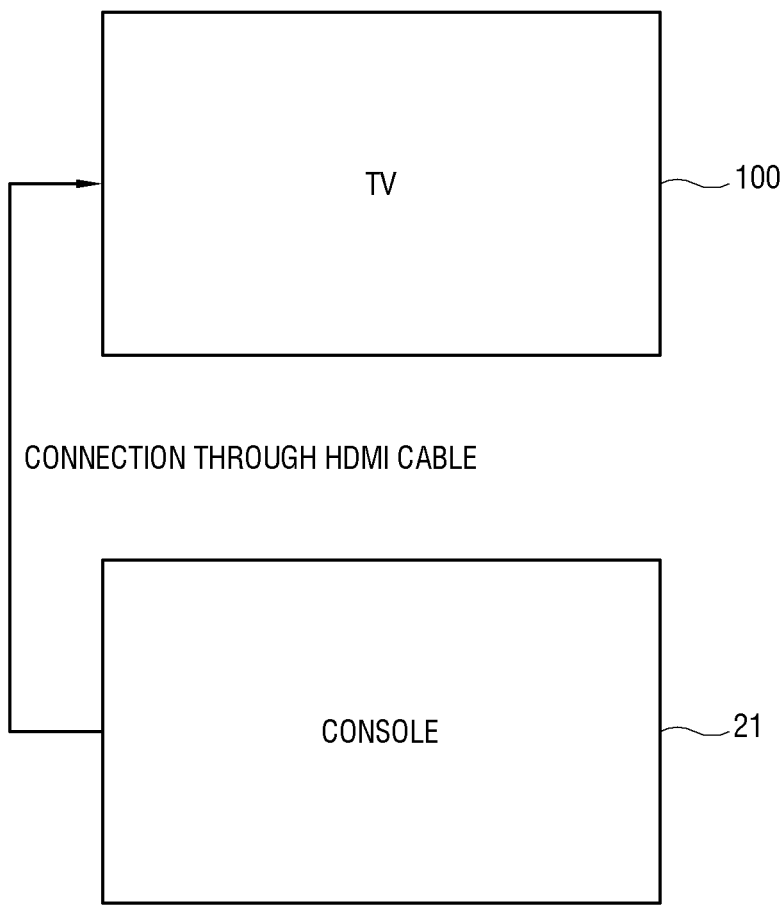
FIG. 1 illustrates an example of a configuration whereby a television and an external apparatus are connected to each other according to an embodiment of the disclosure.

FIG. 1 illustrates an example of a configuration whereby a television and an external apparatus are connected to each other according to an embodiment of the disclosure. As shown therein, a television (TV) 100 according to the disclosure may be connected to a console 21, which is an external apparatus, through e.g. a high definition multimedia interface (HDMI) cable. The console 21 may fall under e.g. an input source for providing a game image. A connection means between the TV 100 and the console 21 is not limited to an HDMI cable and may include other various connection means through which a multimedia content may be transmitted.

The TV 100 receives, e.g. a game image by frame from the console 21, and determines whether a use state of the game image is an idle state or active state by analyzing frames of the received image.

Figure 2:
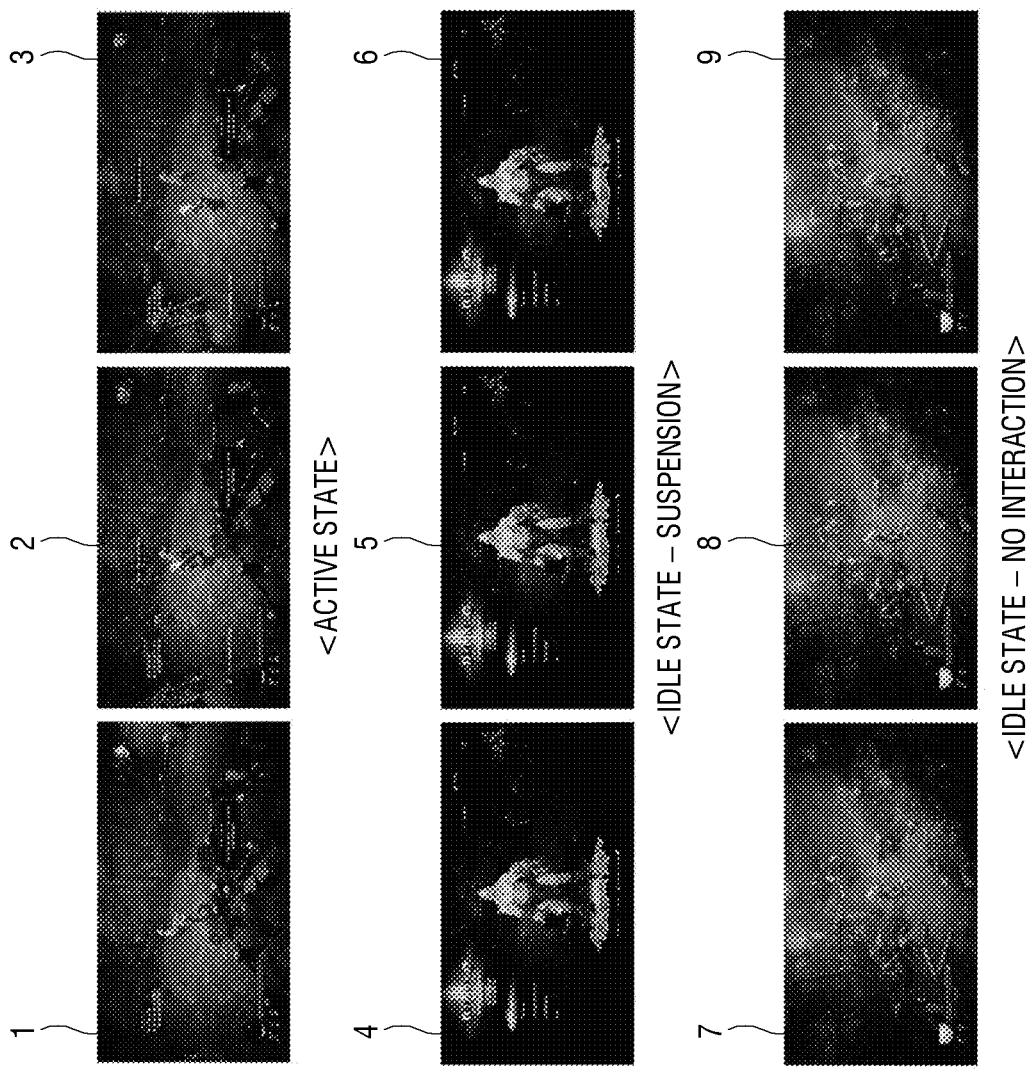
FIG. 2 illustrates examples of use states of a content according to the embodiment of the disclosure.

FIG. 2 illustrates examples of use states of a content according to the embodiment of the disclosure. As shown therein, a use state of a first game image may be determined by comparing consecutive first frame 1, second frame 2 and third frame 3 of the first game image. It may be confirmed that a main character displayed in a central region of the respective frames 1, 2 and 3 of the first game image is moving to the left. In such case, the TV 100 may determine that the use state of the first game image is an active state.

If consecutive frames 4, 5 and 6 of a second game image are compared, it may be confirmed that a main character being displayed in a central region of the frames 4, 5 and 6 does not move and stands still. In such case, the TV 100 may determine that a use state of the second game image is an idle state.

If consecutive frames 7, 8 and 9 of a third game image are compared, it may be confirmed that a main character in a central region of the frames 7, 8 and 9 does not move and characters in the background are moving. In such case, a use state of the third game image may be determined to be an idle state as there is no user input for moving the main character although the game image is not suspended.

According to the disclosure, an algorithm for determining a use state of a content image based on a degree of a change in frames is provided without visually confirming the use state of the content image.

Figure 3:
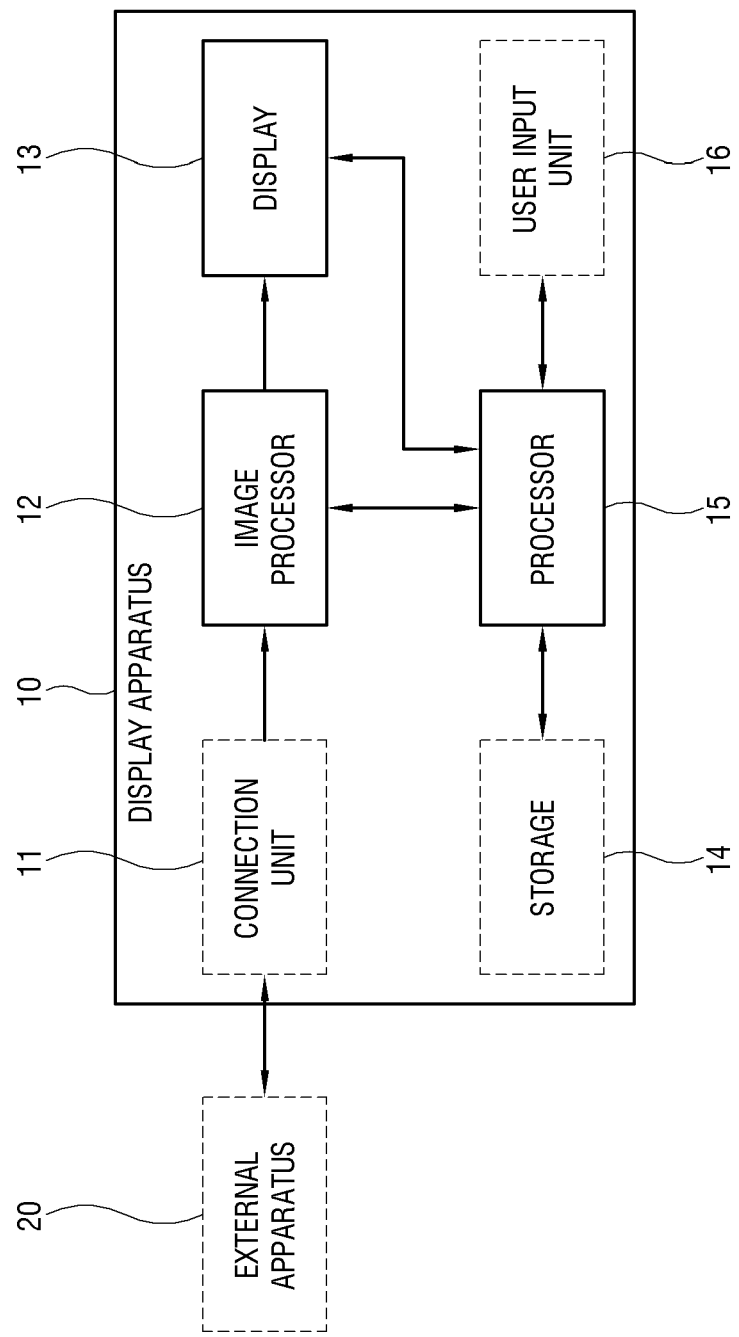
FIG. 3 is a block diagram of a display apparatus according to an embodiment of the disclosure.

FIG. 3 is a block diagram of a display apparatus according to an embodiment of the disclosure. As shown therein, a display apparatus 10 according to the disclosure includes an image processor 12, a display 13 and a processor 15, and may further include a connection unit 11, a user input unit 16 and a storage 14. As an example, the display apparatus 10 may be connected to an external apparatus 20 through the connection unit 11. The display apparatus 10 is implemented as e.g. a TV, smart phone, a tablet PC, a personal computer, etc. The elements included in the display apparatus 10 are not limited by the embodiment of the disclosure, and some of the elements may be excluded or additional elements may be added.

The connection unit 11 as a connector connects the external apparatus 20 through e.g. an HDMI cable. The external apparatus 20 includes, e.g. a game console, a DVD, etc., and includes other devices, which may provide a content image.

The display apparatus 10 may receive various forms of image signals, e.g. game images, sports images, broadcasting images and DVD images from the external apparatus 20 through the connection unit 11. The image signals that the display apparatus 10 may receive from the external apparatus 20 may include other various forms of images.

The image processor 12 performs a preset signal processing process with respect to an image signal transmitted by the external apparatus 20 or a broadcasting signal transmitted by a broadcasting station. Examples of signal processing by the image processor 12 include demultiplexing, decoding, de-interlacing, scaling, noise reduction, detail enhancement, etc. and the types of signal processing are not limited to the foregoing. The image processor 12 may be implemented as a system-on-chip (SOC) where various functions corresponding to such processes are integrated or as an image processing board where individual configurations are installed to independently perform each of the processes.

The display 13 displays an image thereon based on an image signal or broadcasting signal processed by the image processor 12. The method of implementing the display 13 is not limited, and the display 13 may be implemented as various forms such as a plasma display panel (PDP), a liquid crystal display (LCD), organic light emitting diodes (OLED), and a flexible display.

The storage 14 includes a first memory (not shown) and a second memory (not shown). The first memory is implemented as a non-volatile memory such as a flash memory to store data therein regardless of whether or not system power of the display apparatus 10 is provided.

The first memory stores therein a plurality of instructions to execute at least one application. The first memory causes reading, writing, editing, deletion, update, etc. to be performed with respect to the plurality of instructions stored as above.

The second memory is a high-speed buffer memory provided between the first memory and a processor 15 and is referred to as a cache memory or local memory. The second memory is faster in speed than a flash memory, and is accessible directly by the processor 15. The second memory stores therein data or program commands, which are frequently accessed by the processor 15, so that the data or program commands may be promptly used without being repeatedly searched. The second memory may be implemented as, e.g. a RAM. According to an embodiment of the disclosure, the second memory may be, e.g. integrally provided in the processor 15.

The user input unit 16 as a user input receiver receives a user's input to control at least one of functions of the display apparatus 10. For example, the user input unit 16 may receive a user's input to select a part of a user interface displayed by the display 13. The user input unit 16 may be implemented as an input panel provided in an external side of the display apparatus 10 or as a remote controller communicating with the display apparatus 10 in an infrared mode. In addition, the user input unit 16 may be implemented as a keyboard, mouse, etc. connected to the display apparatus 10 or as a touch screen provided in the display apparatus 10.

According to an embodiment of the disclosure, the user input unit 16 may receive a user's input from a mobile device (not shown) that communicates with the display apparatus 10 by Wi-Fi or Bluetooth or infrared communication method. In such case, the mobile device may include a smart phone, etc., and may be installed with, e.g. a remote controller application, which is executed to transmit a user's input to the display apparatus 10 through button touch to control an operation of the display apparatus 10.

The processor 15 performs a control process to control a plurality of functions that the display apparatus 10 may perform. The processor 15 may be implemented as a central processing unit (CPU), and includes three areas of control, calculation and register. The control area interprets a program command, instructs each element of the display apparatus 10 to perform operations according to the meaning of the interpreted command. The calculation area performs an arithmetic operation and logical operation and perform an operation necessary for each element of the display apparatus 10 to operate according to an instruction by the control area. The register is a memory location where necessary information is stored while a CPU executes a command. The register stores commands and data on each element of the display apparatus 10 and stores a result of operation.

The processor 15 executes at least one program, and may execute, e.g. an operating system (OS) of the display apparatus 10.

Figure 4:
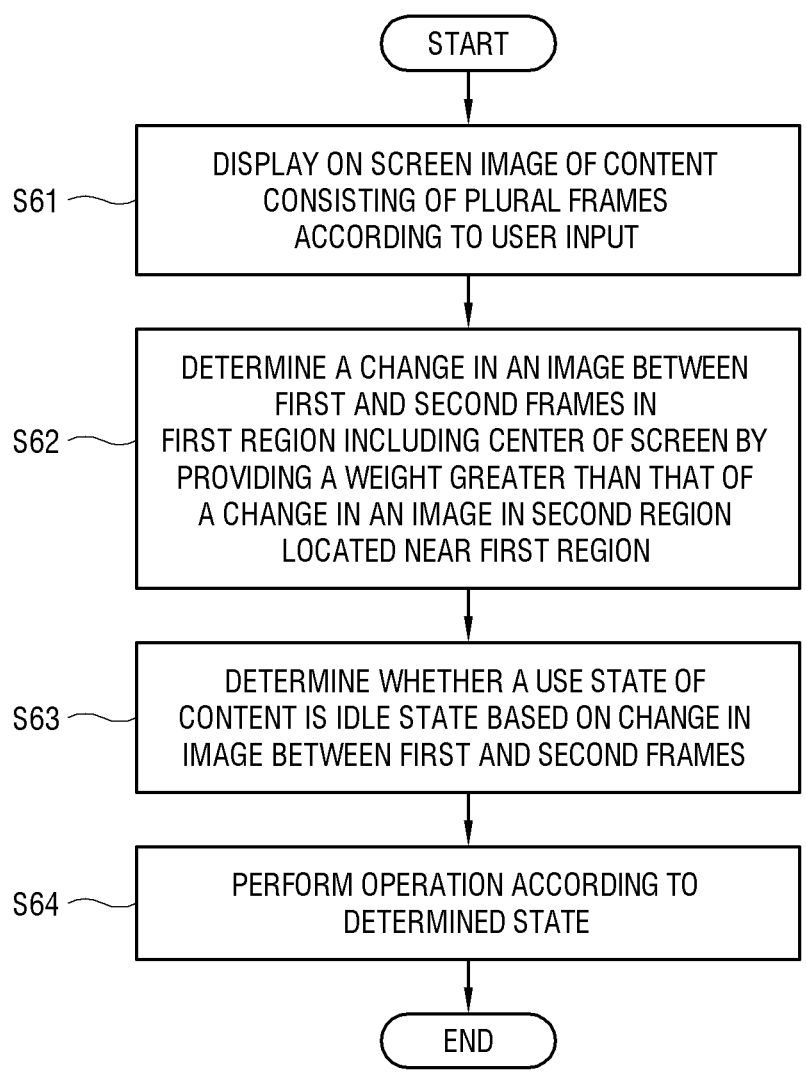
FIG. 4 is a flowchart showing a control method of the display apparatus according to the embodiment of the disclosure.

According to an embodiment of the disclosure, operations of the processor 15 may be shown as in the flowchart in FIG. 4. First, at operation S61, the processor 15 displays on a screen an image of a content consisting of a plurality of frames.

At operation S62, the processor 15 determines a change in an image between consecutive first and second frames in a first region including a center of the screen by providing a weight greater than that of a change in an image in a second region located near the first region. The first region falls under e.g. a central region of the screen where a main character is located in a game image. The second region falls under, e.g. a corner region or an edge region that displays a state and points in a game image or that includes other characters other than the main character, and a background.

The change in the image may be determined based on a difference of brightness between the first and second frames. The brightness of the image may be measured by e.g. grayscale.

The operation S62 may include an operation for determining a change in an image based on a weighted mean absolute difference (MAD) between the first and second frames. In calculating the weighted MAD, different weighted values may be assigned to the first and second regions.

According to an embodiment of the disclosure, different weighted values may be assigned to the first and second regions of the screen at respective update cycles. Also, different weighted values may be assigned to the first and second regions of the screen according to at least one of a genre or type of a content. By the foregoing method, a change in an image may be determined by assigning different weighted values to the central and neighboring areas of the screen.

At operation S63, the processor 15 determines whether a use state of a content is an idle state based on a change in an image between first and second frames. For example, if a change in an image between first and second frames is a preset value or higher, the processor 15 determines that the use state of a content is an active state. If a change in an image between first and second frames is less than a preset value, the processor 15 determines that the use state of a content is an idle state. The active state means that a content image is being viewed or manipulated by a user whereas the idle state means that a content image is temporarily suspended or is not manipulated by a user.

According to an embodiment of the disclosure, the processor 15 may receive a content image by frame from the external apparatus 20 through the connection unit 11, and may determine a use state of the content by analyzing the received frames. If the console 21 provides a game image to the TV 100, a user input is made through the console 21 rather than the TV 100, but a use state of the game image according to the user input may be determined by the TV 100.

By the aforementioned method, whether a content is in an idle state or an active state may be identified more accurately by considering differences in the change in consecutive frames for each region of the screen.

Lastly, at operation S64, an operation is performed according to the determined state. For example, if a content image is in an idle state, a background operation and downloading operation of at least one of other applications executed by the display apparatus 10 may be simultaneously performed. As another example, if a content image is in an active state, it means that a user is viewing or manipulating the content image, and a background operation and downloading operation of at least one of other applications may be restricted.

As above, according to the disclosure, a use of a plurality of applications may be optimized and performance of the display apparatus 10 may be improved by determining whether the content image is in an idle state or not.

The display apparatus 10 according to the disclosure may download an instruction stored in a separate computer program product (not shown) and execute the same to thereby perform an operation rather than performing an operation of determining whether a content displayed by the screen is in an idle state through the processor.

According to an embodiment of the disclosure, the computer program product includes a memory storing an instruction therein, and a processor. The instruction includes displaying on the screen of the display an image of a content consisting of a plurality of frames according to a user input, determining a change in an image between consecutive first and second frames in a first region including a center of the screen by providing a weight greater than that of a change in an image in the second region located near the first region, determining whether a use state of the content is in an idle state based on the change in the image, and performing an operation according to the determined state, upon execution by the processor.

According to an embodiment of the disclosure, the instruction may include determining a change in an image based on a difference in brightness between the first and second frames.

Figure 5:
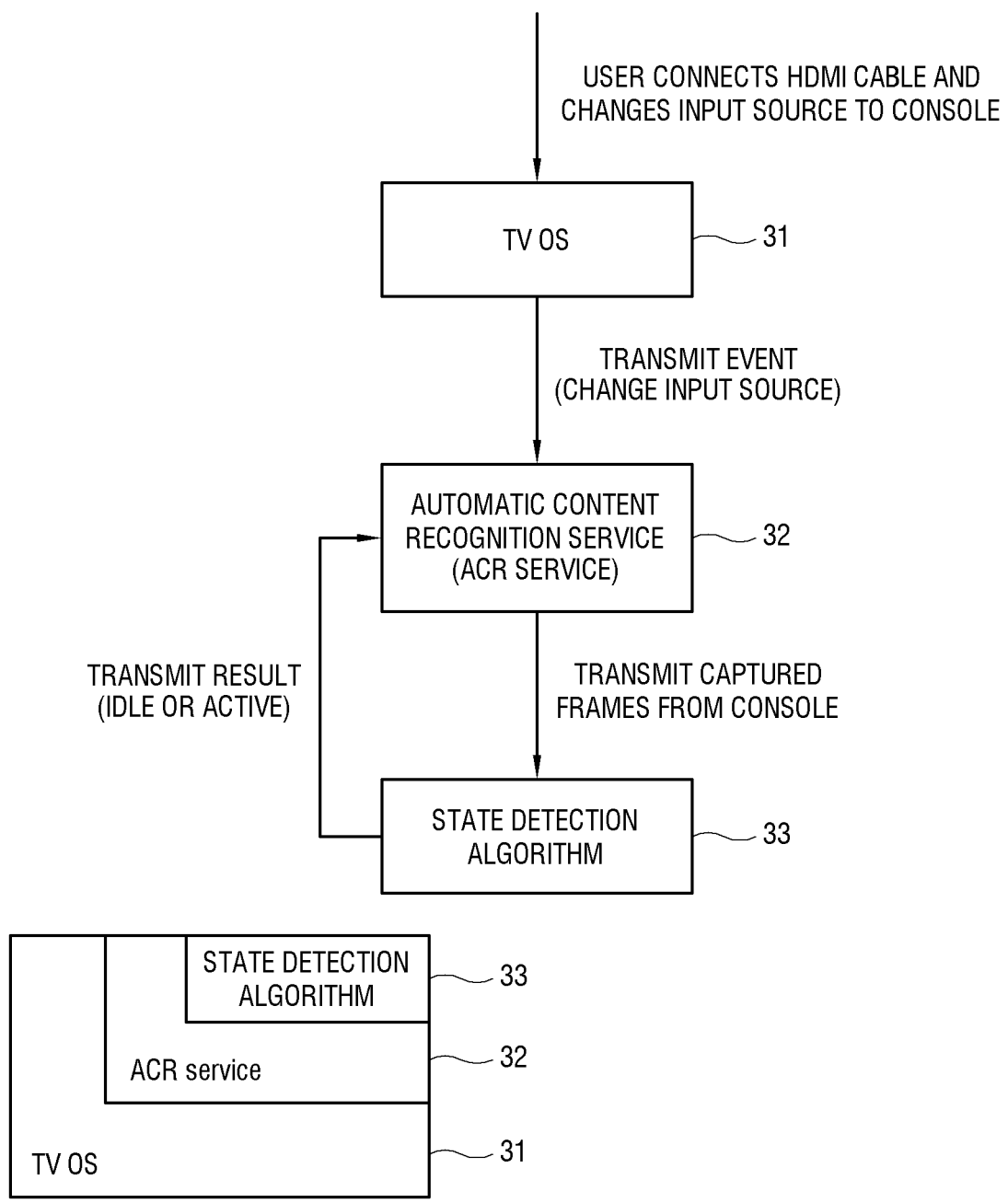
FIG. 5 illustrates a relationship among a TV OS, an ACR service and a state detection algorithm according to an embodiment of the disclosure.

FIG. 5 illustrates a relationship among a TV OS, an ACR service and a state detection algorithm according to an embodiment of the disclosure. The instruction executed by the processor 15 according to an embodiment of the disclosure may include an instruction of an operation system (OS) 31 of a television, an automatic content recognition (ACR) service 32 executed on the basis of support by the OS 31, and a program state detection algorithm 33 executed in synchronization with the ACR service 32. Hereinafter, an execution by the processor 15 of an instruction of the OS 31, the ACR service 32 or the state detection algorithm 33 will be described as a type of an operation of the program.

As shown in FIG. 5, if a user connects the console 21 (see FIG. 1) to the TV 100 (see FIG. 1) through an HDMI cable and changes an input source, the OS 31 transmits an event to the ACR service 32 to inform that the input source has been changed.

The ACR service 32 captures a content image, which is transmitted by the console 21, by frame based on the event transmitted by the OS 31, and transmits a plurality of frames as captured above to the state detection algorithm 33.

Figure 6:
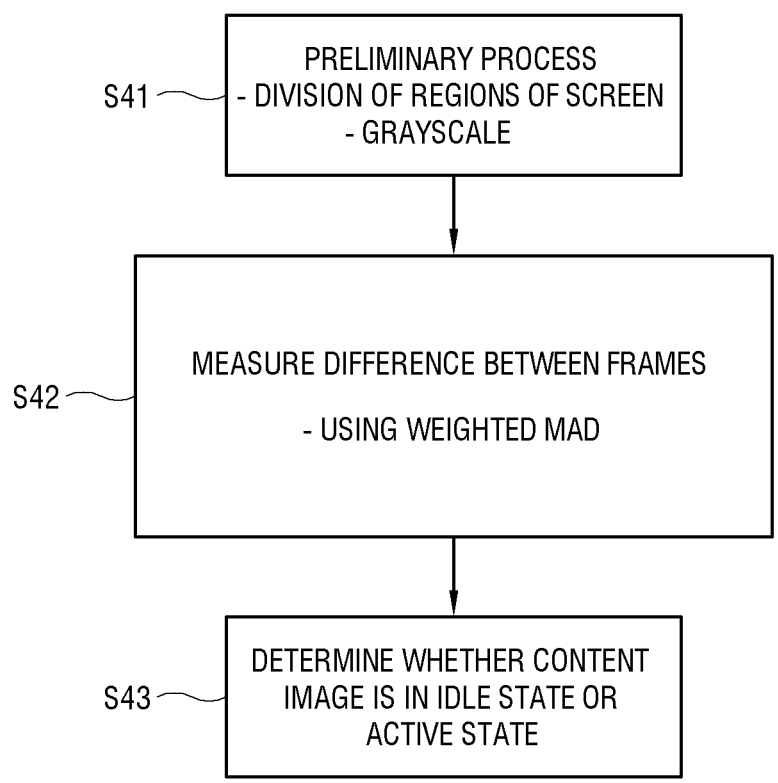
FIG. 6 illustrates an example of a flowchart showing operations for determining a use state of a content according to the embodiment of the disclosure.

The state detection algorithm 33 analyzes the plurality of frames transmitted by the ACR service 32 and determines whether a use state of the content is an idle state or active state. FIG. 6 is a flowchart showing operations of the state detection algorithm 33. At operation S41, the state detection algorithm 33 perform a preliminary process.

More specifically, the operation S41 includes an operation of dividing each frame into a plurality of regions, and of acquiring a grayscale from the divided regions.

At operation S42, the state detection algorithm 33 measures a degree of change in an image between consecutive frames. In order to measure a degree of a change in an image, the state detection algorithm 33 utilizes a weighted MAD whereby a difference of mean values of a grayscale between consecutive frames is calculated and different weighted values are assigned to respective regions.

Lastly, at operation S43, the state detection algorithm 33 determines whether a use state of the content is an idle state or active state, based on the measured degree of a change in the image.

The state detection algorithm 33 transmits to the ACR service 32 a result on the use state of the content that has been obtained by analyzing the plurality of frames as above.

The ACR service 32 acquires information on whether the use state of the content is the idle state or active state based on the transmitted result, and provides the information on the use state of the content to enable the OS 31 to perform a corresponding operation.

According to an embodiment of the disclosure, if a use state of a content is an idle state, the OS 31 may simultaneously execute a background operation and downloading operation of at least one application. The OS 31 may also execute at least one application that is difficult to be performed simultaneously while a content image is being manipulated by a user.

According to another embodiment of the disclosure, if a use state of a content is an idle state, the OS 31 may determine that the content image is not being manipulated by a user and limit power supply to enter a power-saving mode.

If the use state of the content is the active state, the OS 31 may limit the background operation and the downloading operation of at least one of other applications.

According to an embodiment of the disclosure, if the active state continues for a preset time or longer, the OS may deactivate a screen and manipulation of a content image according to a user setting.

Figure 7:
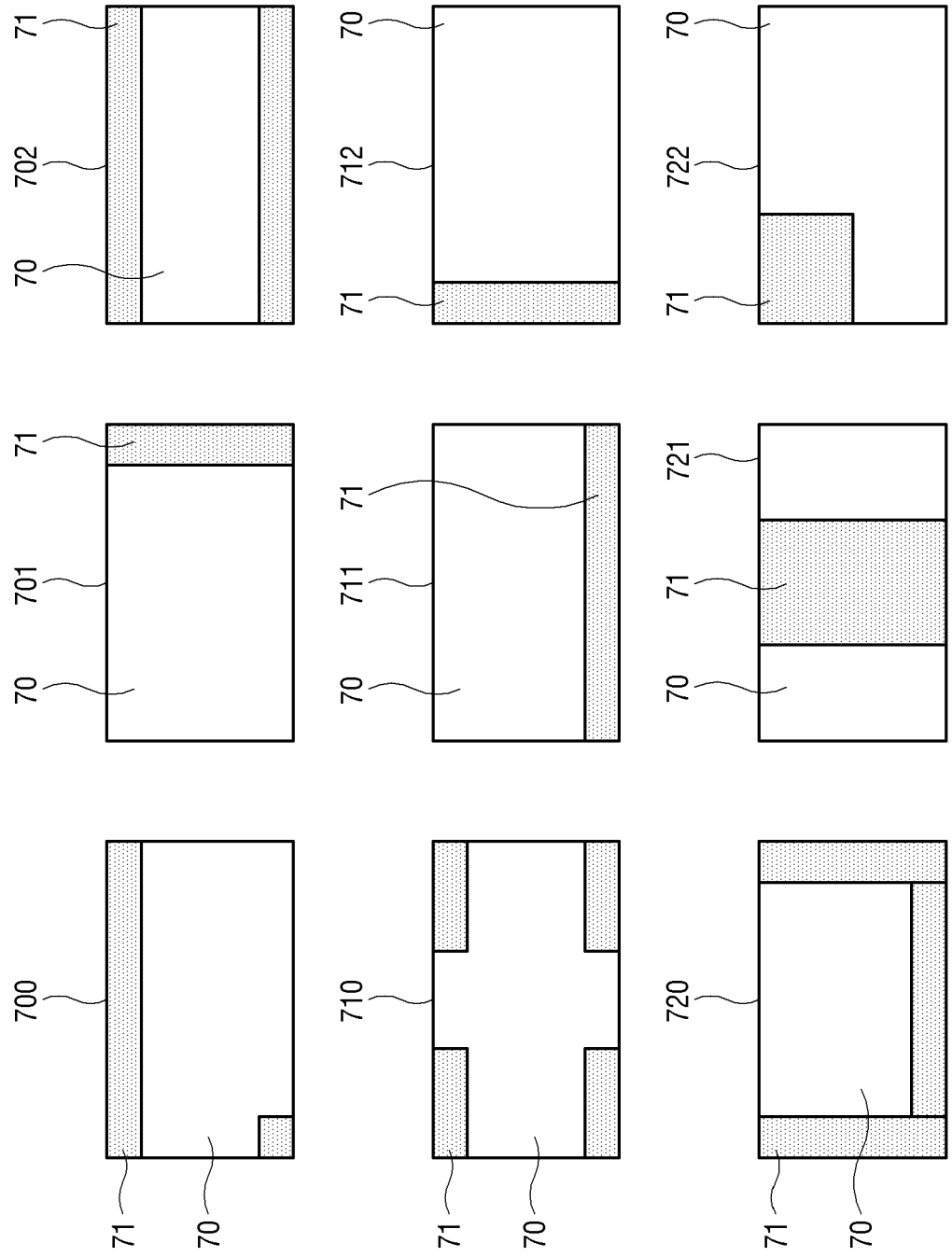
FIG. 7 illustrates an example of various screen layouts of a content image according to an embodiment of the disclosure.

FIG. 7 illustrates examples of various screen layouts of a content image according to an embodiment of the disclosure. As shown therein, screen layouts 700, 701, 702, 710, 711, 712, 720, 721 and 722 of a content image may vary including a play region 70 and a state and information region 71.

The play region 70 may be a display region of a main image of a content while the state and information region 71 may be a display region of a UI menu.

For example, in the case of a game image, the play region 70 falls under a region including a main character, and the state and information region 71 falls under a region including other characters and background or displaying a state, points, etc.

The play region 70 mainly includes a center of a screen and the state and information region 71 includes a corner and edge of the screen. However, the locations of the play region 70 and the state and information region 71 in the screen are not limited to the foregoing and may vary.

The display apparatus 10 according to the disclosure places a more weight to the play region 70 than the state and information region 71 in determining a change in an image between consecutive frames.

Figure 8:
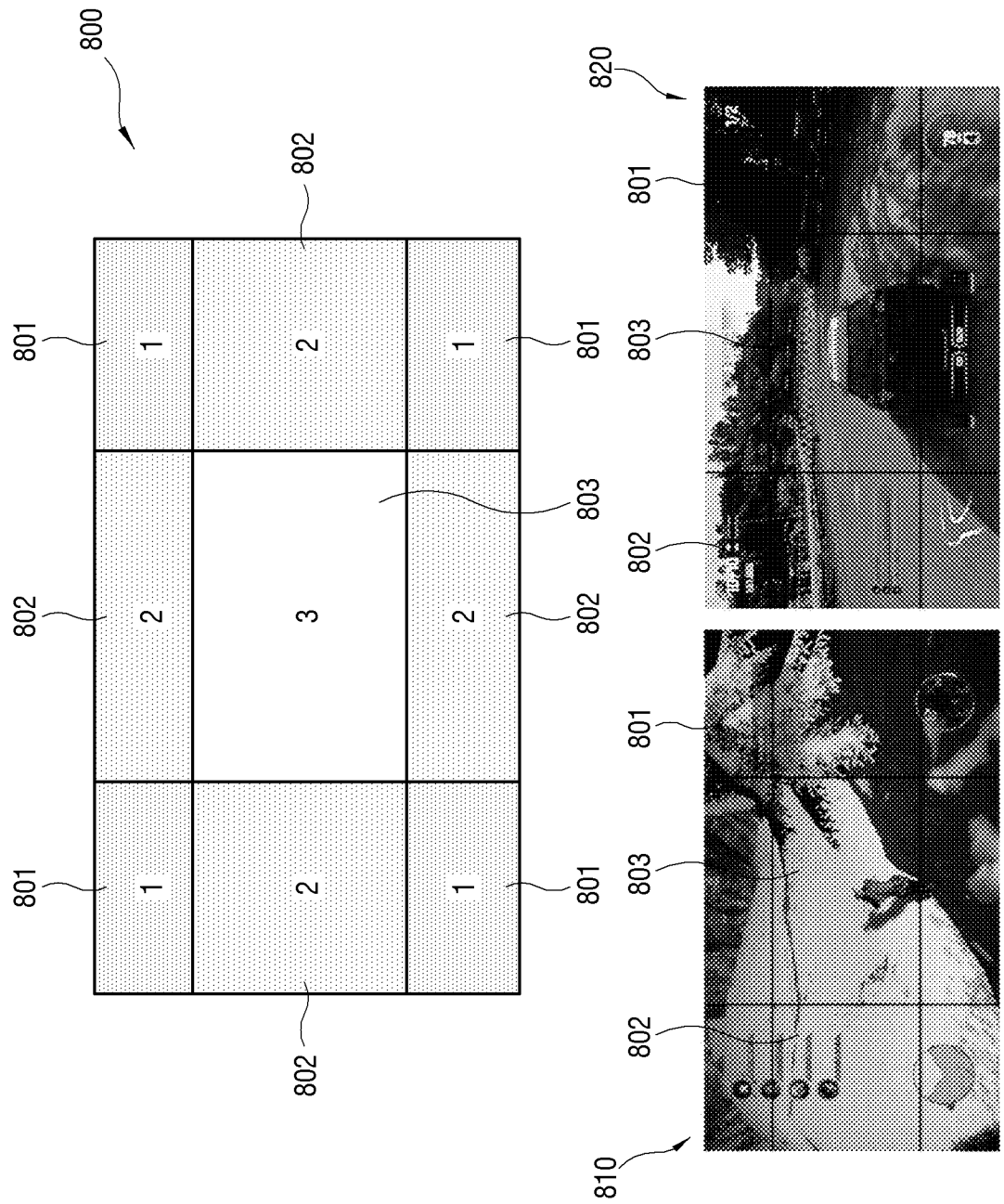
FIG. 8 illustrates an example of assigning different weighted values to divided regions of a content image according to an embodiment of the disclosure.
Figure 10:
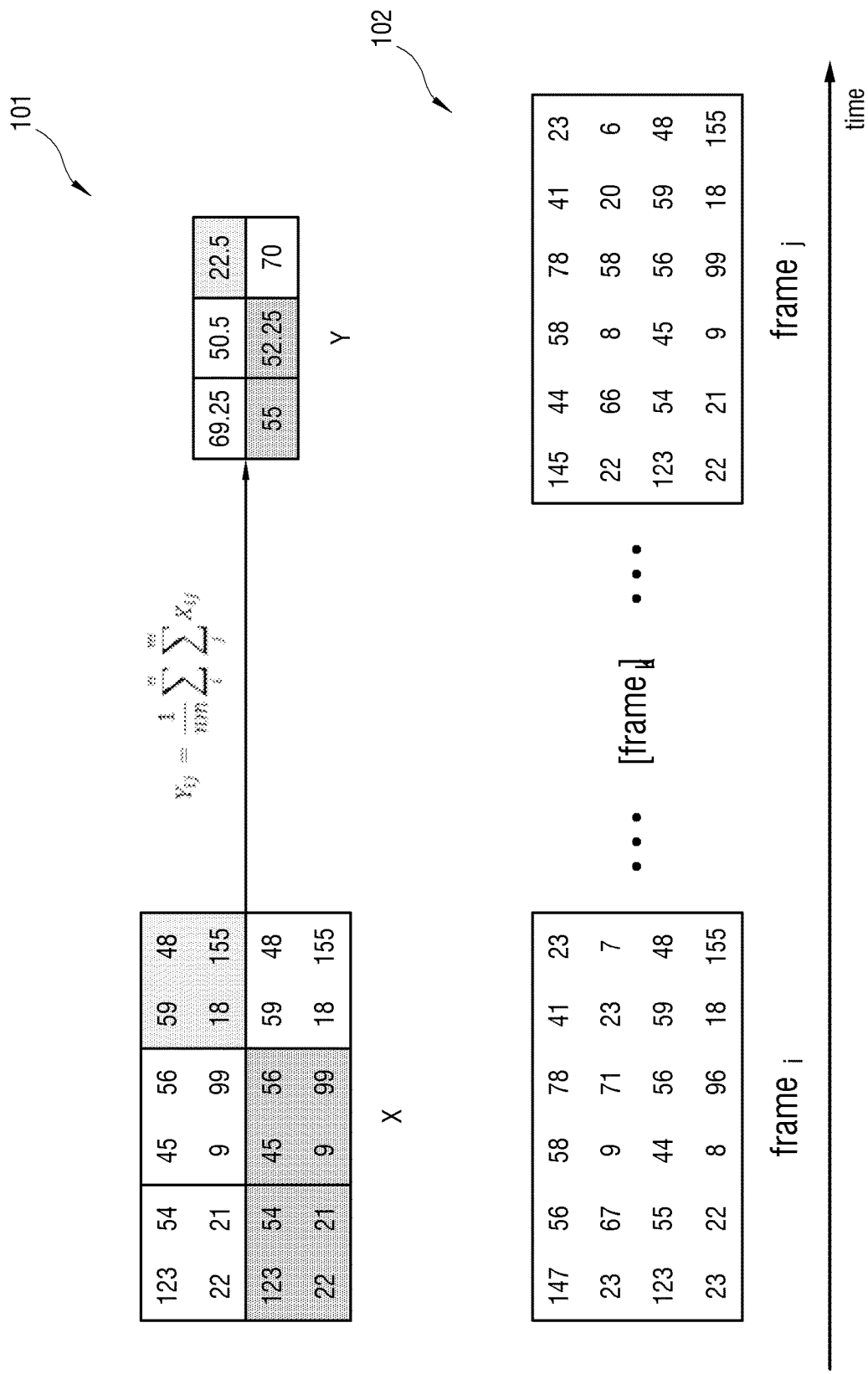
FIG. 10 illustrates an example of a mean value of a frame by region and consecutive frames according to an embodiment of the disclosure.

FIG. 8 illustrates an example of assigning different weighted values to divided regions of a content image according to an embodiment of the disclosure. As shown therein, in the display apparatus 10 according to the disclosure, a screen layout 800 is divided into nine regions 801, 802 and 803, which are applied with different weighted values. The nine regions 801, 802 and 803 include a center region 803 of a screen, and a corner region 801 and edge region 802 located near the center region 803.

As an example, the processor 15 may assign the highest weighted value to the center region 803 of the screen layout 800 and a lower weighted value to the edge region 802 than the center region 803. Also, the processor 15 may assign the lowest weighted value to the corner region 801.

The processor 15 may determine weighted values, which are assigned to the areas 801, 802 and 803, according to an update cycle of the areas. For example, with respect to game images 810 and 820, the processor 15 assigns a high weighted value to the center region 803 of the screen which is frequently updated by a movement of a main character or main object so that a change in the image can be significantly determined.

The processor 15 assigns a lower weighted value to the edge region, in which points and state of a game are intermittently updated, than to the center region 803. The processor 15 assigns the lowest weighted value to the corner region 801 displaying a background that is rarely updated.

As described above, according to the disclosure, different weighted values may be assigned by taking into account how frequently the image is updated in the center and neighboring areas of the screen.

According to an embodiment of the disclosure, the processor may assign different weighted values to a center and neighboring regions of a screen by taking into account a genre or type of a content. For example, if a genre of a content image is an RPG game, the processor 15 may assign the highest weighted value to a center region of the screen; if a genre of a content image is a fighting game, the processor 15 may assign the highest weighted value to left and right areas of the screen.

FIG. 9 illustrates a detailed equation of a weighted MAD for determining a change in an image according to an embodiment of the disclosure. As shown therein, the display apparatus 10 according to the disclosure utilizes a weighted MAD 90, through which a degree of a change in an image between consecutive frames can be measured, to determine whether a content image is in an idle state or an active state.

In calculating the weighted MAD 90, the processor 15 measures a mean value Y of a grayscale X for each of the divided regions, and utilizes a difference in the mean value Y between consecutive frames. At this time, the processor 15 assigns different weighted values to the divided regions by taking into account an update cycle, a genre of a content, etc.

FIG. 11 illustrates an example of an algorithm for determining a use state of a content according to an embodiment of the disclosure. As shown therein, the display apparatus 10 according to the disclosure employs a strategy 110 whereby the display apparatus 10 compares the weighted MAD, which has been calculated in FIG. 9, with threshold values $T_{high}$ and $T_{low}$ and determines whether a content image is in an idle state, or in an active state or being switched to a new scene.

As an example, if the weighted MAD is higher than the threshold value $T_{high}$, the processor 15 determines that the content image has been switched to a new scene. If the weighted MAD is between the threshold value $T_{low}$ and the threshold value $T_{high}$, the processor 15 determines that the content image is in an active state. If the weighted MAD is lower than $T_{low}$, the processor 15 determines that the content image is in an idle state.

Figure 12:
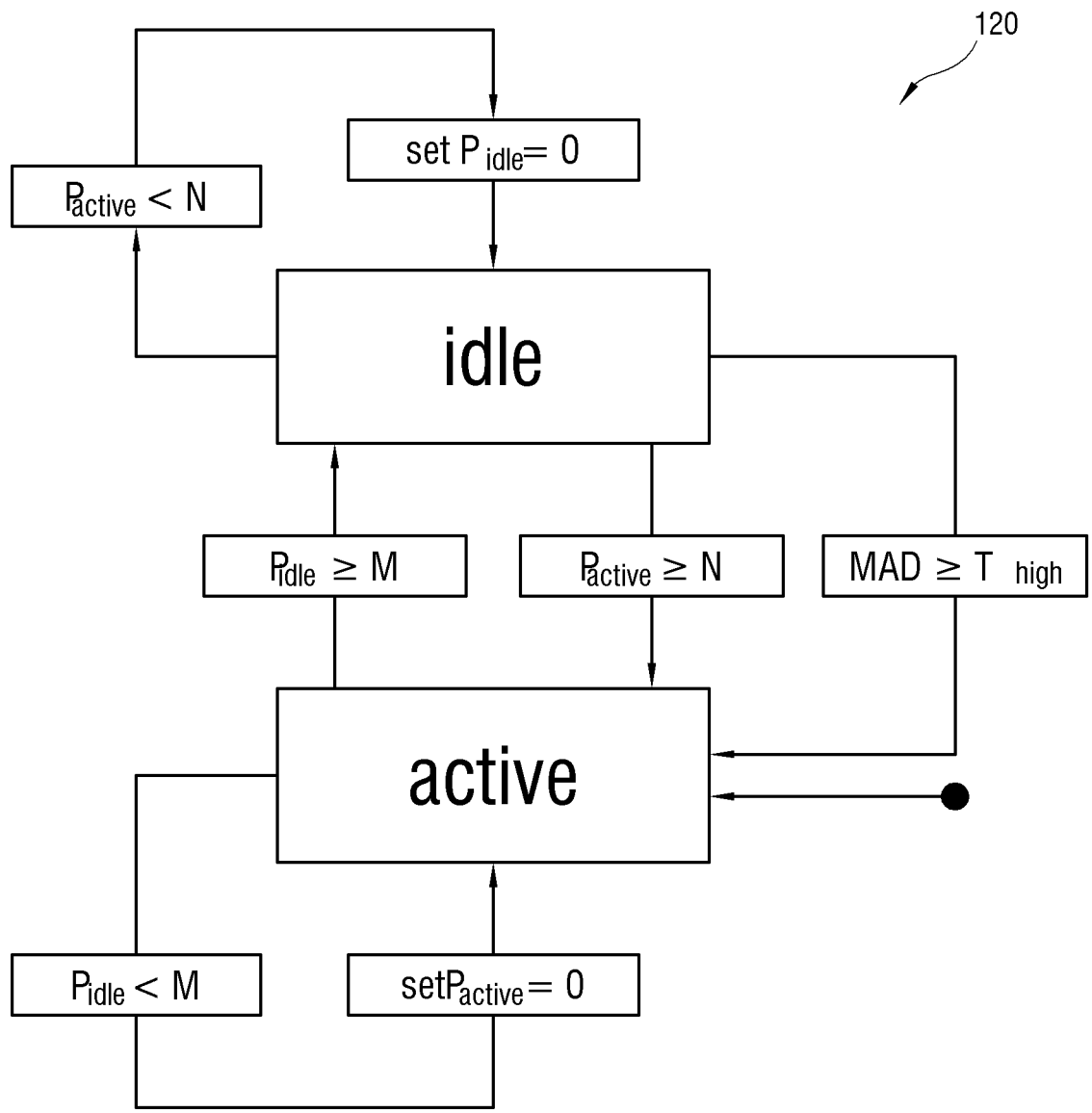
FIG. 12 illustrates a strategy for determining a switch between an idle state and an active state according to an embodiment of the disclosure.

FIG. 12 illustrates a strategy for determining a switch between an idle state and an active state according to an embodiment of the disclosure. As shown therein, the display apparatus 10 provides a strategy 120 for determining whether a use state of a content image has been switched.

If the weighted MAD is higher than $T_{high}$ or if a rate of occurrence Pactive of the active state is a predetermined value N or higher, the processor 15 determines that a content image has been switched from an idle state to an active state.

If a rate of occurrence Pidle of the idle state is a predetermined value M or higher, the processor 15 determines that the content image has been switched from the active state to the idle state.

If the rate of occurrence Pidle of the idle state is lower than a predetermined value M in the active state, the processor 15 determines that a switch of the state has not occurred and initializes the rate of occurrence Pactive of the active state. Likewise, if the rate of occurrence Pactive of the active state is lower than a predetermined value N in the idle state, the processor 15 determines that a switch of the state has not occurred and initializes the rate of occurrence Pidle of the idle state.

According to an embodiment of the disclosure, if the minimum state maintenance time of a content image passes a predetermined time, the processor 15 may allow a switch between the idle state and the active state. As an example, if an active state of a game image passes an allowed time set by a user, the processor 15 may switch the game image to the idle state in which the game image is suspended and thus a user is not able to continue to play the game.

According to another embodiment of the disclosure, if the number of switches of the state of a content image exceeds a predetermined number, the processor 15 may allow a switch between an idle state and an active state. As an example, if the number of switches from the idle state to the active state of a game image exceeds the allowed number set by a user, the processor 15 may suspend the game image so that a user is not able to continue to play the game.

Figure 14:
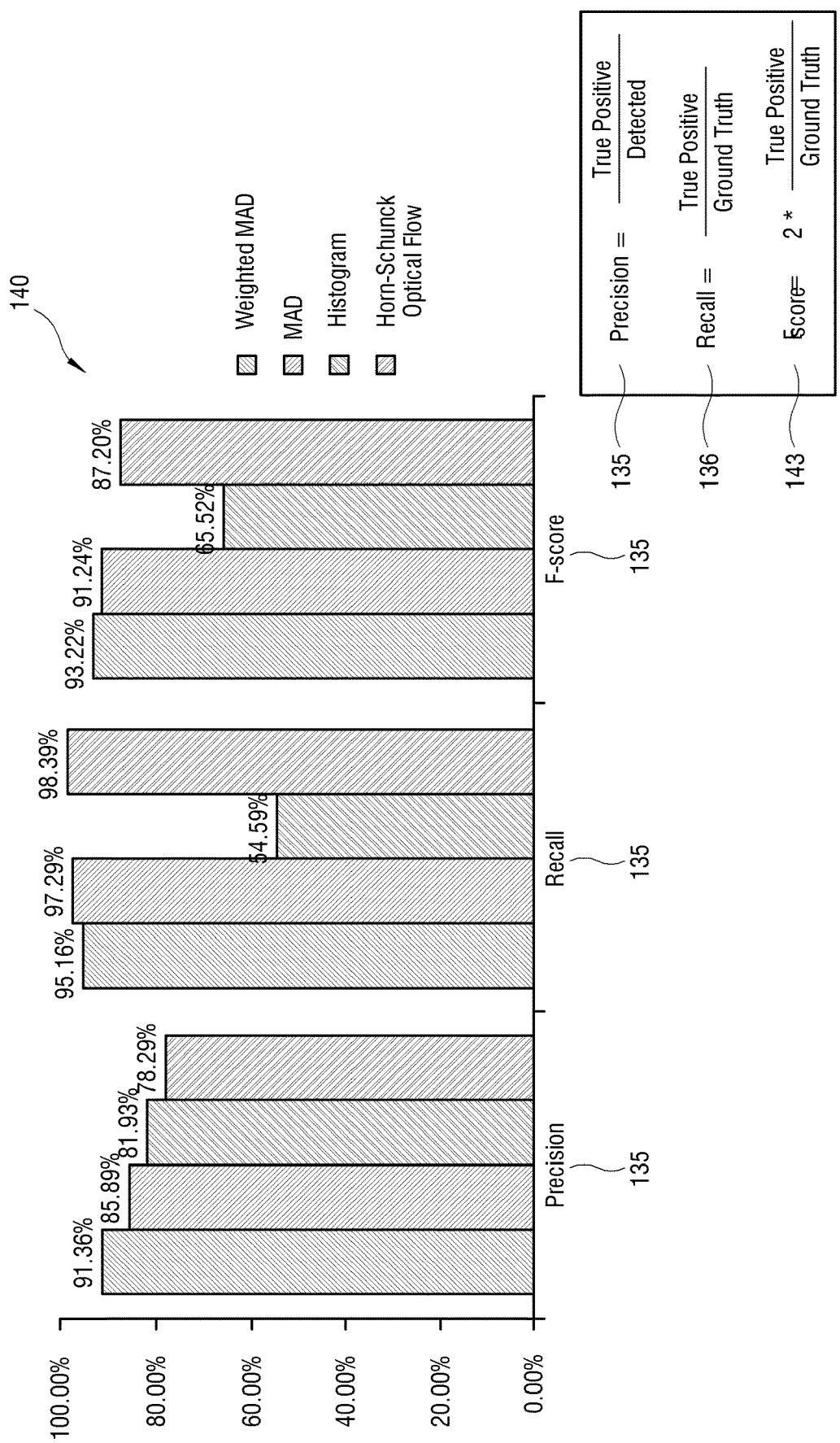

FIGS. 13 and 14 illustrate examples of comparison of accuracy of various algorithms for determining a use state of a content according to an embodiment of the disclosure. FIG. 13 is a table showing a comparison of performance of various algorithms 131 for determining a use state of a game image.

In the table 130, an algorithm using the weighted MAD according to the disclosure, and algorithms using a mean absolute difference (MAD), histogram difference and an optical flow difference are compared with each other.

To compare performance of the algorithms, a precision 135, a recall 136 and a processing time per image 137 are used.

The precision 135 means the rate of TRUE detections 132 out of the total detections 134, and the recall 136 means the rate of TRUE detections 132 out of the total TRUE 133. If the precision 135 and recall 136 are high, the relevant algorithm may be determined to be a reliable algorithm.

In the table 130, the precision 135 and the recall 136 of the algorithm using the weighted MAD according to the disclosure are 91.36% and 95.16%, respectively, which are generally higher than other algorithms. Also, the processing time per image 137 is 0.0844 s and the algorithm using the weighted MAD is faster than other algorithms.

Therefore, in determining whether the content image is in the idle state or active state, the algorithm using the weighted MAD according to the disclosure is more reliable than other algorithms.

A graph 140 in FIG. 14 shows a comparison among the precision 135 and recall 136 of the various algorithms in the table 130 in FIG. 13, and an F-score 143.

The F-score 143 incorporates performance of the precision 135 and the recall 136 into a single value, and the higher the value is, the better performance the algorithm has.

In a graph 143, the weighted MAD according to the disclosure has generally higher values in the precision 135, the recall 136 and the F-score 143 than other algorithms, and therefore, the algorithm using the weighted MAD according to the disclosure may be determined to be a reliable algorithm for determining whether a content is in an idle state or not.

Although a few embodiments of the disclosure have been described in detail, various changes can be made in the disclosure without departing from the scope of claims.

The invention claimed is:

1. A display apparatus comprising:
a display comprising a screen to display an image thereon;
a processor configured to:
 cause the display on the screen of the display an image of a content including a plurality of frames,
 based on a degree of a change in an image between consecutive first and second frames being identified to be lower than a threshold value, identify that a use state of the content is in an idle state, and
 perform an operation according to the identified state,
 wherein the processor is configured to identify a change in an image in a first region comprising a center of the screen by providing a weight greater than that of a change in an image in a second region located near the first region.

2. The display apparatus according to claim 1, further comprising:
a connector configured to connect an external apparatus,
wherein the processor is configured to receive the content from the external apparatus through the connector.

3. The display apparatus according to claim 1, wherein the processor is configured to identify the change in the image based on a difference in brightness between the first and second frames.

4. The display apparatus according to claim 1, wherein the processor is configured to identify the change in the image based on a weighted mean absolute difference between the first and second frames.

5. The display apparatus according to claim 1, wherein the processor is configured to assign different weighted values to the first region and the second region at respective update cycles.

6. The display apparatus according to claim 1, wherein the processor is configured to assign different weighted values to the first region and the second region according to at least one of a genre and type of the content.

7. The display apparatus according to claim 1, wherein the processor is configured to identify that a use state of the content is an active state based on a change in the image in the idle state being a predetermined value or higher.

8. The display apparatus according to claim 7, wherein the processor is configured to allow a switch between the idle state and the active state corresponding to at least one of a lapse of a minimum maintenance time of the content or an excess of a number of minimum occurrences of a switch event.

9. The display apparatus according to claim 1, wherein the second region comprises at least one of a corner region and an edge region of the screen.

10. The display apparatus according to claim 1, wherein the first region is a display region of a main image of the content and the second region is a display region of a user interface (UI) menu.

11. A computer program product comprising:
a memory configured to store a plurality of instructions therein; and
a processor;
wherein the plurality of instructions cause, upon execution by the processor,
causing displaying, on a screen of a display, an image of a content including a plurality of frames according to a user input,
identifying a change in an image between consecutive first and second frames in a first region including a center of the screen by providing a weight greater than that of a change in an image in a second region located near the first region,
identifying whether that a use state of the content is an idle state based on a degree of the change in the image being identified to be lower than a threshold value, and
performing an operation according to the identified state.

12. A method for controlling a display apparatus comprising:
displaying on a screen an image of a content including a plurality of frames;
identifying a change in an image between consecutive first and second frames in a first region including a center of the screen by providing a weight greater than that of a change in an image in a second region located near the first region;
based on a degree of the change in the image being identified to be lower than a threshold value, identifying that a use state of the content is an idle state; and
performing an operation according to the identified state, upon execution by the processor.

13. The method according to claim 12, further comprising:
connecting an external apparatus; and
receiving the content from the connected external apparatus.

14. The method according to claim 12, further comprising:
identifying the change in the image based on a difference in brightness between the first and second frames.

* * * * *